(12) United States Patent
Huang

(10) Patent No.: US 7,131,251 B2
(45) Date of Patent: Nov. 7, 2006

(54) POCKET SEALING MACHINE INCLUDING A RETRACTABLE SUCTION HEAD

(76) Inventor: Joseph Huang, 485 W. Wistaria Ave., Arcadia, CA (US) 91007

( * ) Notice: Subject to any disclaimer, the term of this patent is extended or adjusted under 35 U.S.C. 154(b) by 28 days.

(21) Appl. No.: 11/022,389

(22) Filed: Dec. 23, 2004

(65) Prior Publication Data

US 2006/0137299 A1 Jun. 29, 2006

(51) Int. Cl.
*B65B 31/06* (2006.01)
(52) U.S. Cl. ........................................ 53/512; 53/374.8
(58) Field of Classification Search .................. 53/512, 53/373.7, 374.8, 374.9, 432, 374.6, 374.4, 53/434; *B65B 31/06*
See application file for complete search history.

(56) References Cited

U.S. PATENT DOCUMENTS

| | | | | |
|---|---|---|---|---|
| 3,869,842 A | * | 3/1975 | Verbeke | 53/413 |
| 4,330,975 A | * | 5/1982 | Kakiuchi | 53/79 |
| 4,860,523 A | * | 8/1989 | Teteishi et al. | 53/512 |
| 5,215,445 A | * | 6/1993 | Chen | 417/313 |
| 5,287,680 A | * | 2/1994 | Lau | 53/512 |
| 5,551,213 A | * | 9/1996 | Koelsch et al. | 53/434 |
| 6,467,242 B1 | * | 10/2002 | Huang | 53/512 |

FOREIGN PATENT DOCUMENTS

| | | | |
|---|---|---|---|
| GB | 1390023 A | * | 4/1975 |
| JP | 07187144 A | * | 7/1995 |

* cited by examiner

*Primary Examiner*—Stephen F. Gerrity
(74) *Attorney, Agent, or Firm*—Alan D. Kamrath; Nikolai & Mersereau, P.A.

(57) ABSTRACT

An opening of a plastic bag with an article stored therein is placed between a cover and a vacuum assembly of a pocket sealing machine. Moving a rib to a second slot will extend a suction head into the opening of the bag. Pressing the cover will enable an electric heater to start heat sealing the opening of the bag. The machine can be relatively moved across the opening of the bag until the suction head is wrapped. After disabling the electric heater, a switch activates a motor for disabling the heat sealing and enabling the suction head to make a vacuum in the bag. Releasing the switch will deactivate the motor. Moving the rib back to a first slot will retract the suction head, and the machine is moved to cover the opening of the bag. Pressing the cover toward the vacuum assembly at that time will enable the electric heater to seal the opening.

5 Claims, 4 Drawing Sheets

POCKET SEALING MACHINE INCLUDING A RETRACTABLE SUCTION HEAD

BACKGROUND OF THE INVENTION

1. Field of Invention

The present invention relates to sealing machines utilizing the principles of heat sealing and, more particularly, to a pocket sealing machine using heat sealing and vacuumizing a plastic bag or microwavable bag so as to maintain airtightness of an article stored therein.

2. Related Art

Bag (e.g., plastic bag or microwavable bag) sealing machines utilizing the principles of heat sealing are well known. However, such prior machines are typically complex in constructions and operation, costly to manufacture, trouble-prone, and unreliable in use. Operation of such conventional sealing machines is usually divided into two steps: first, an article for sealing is put into a zip bag, and then the bag is vacuumized by a pump. Moreover, such conventional sealing machines are relatively bulky, resulting in an increase of the storage space required. Thus, it is desirable to provide a novel pocket sealing machine for a bag in order to overcome the inadequacies of the prior art and contribute significantly to the advancement of the art.

SUMMARY OF THE INVENTION

It is therefore an object of the present invention to provide a pocket sealing machine for heat sealing a plastic bag or microwavable bag with an article stored therein so as to seal and make a vacuum in one machine.

A pocket sealing machine for heat sealing a plastic bag or microwavable bag with an article stored therein so as to seal and make a vacuum includes a lower housing. Two spaced resilient members and an intermediate spring are disposed in a front compartment of the lower housing. An electric heater is mounted on the resilient members and the spring. A switch and a power socket, respectively, are mounted on one side and the rear of the lower housing. An upper housing includes a pivotal cover. A compartmented member is secured to a front bottom of the cover. A pressing member and a pressing block are located in the compartmented member. A spring provided between the cover and the compartmented member is urged against the pressing member. An elastic piece having a forward hole is put on a projection projected downwardly from the cover. A vacuum assembly is mounted on the lower housing and includes a motor assembly, a hose, a suction head, a spring and a casing. The spring is put on one end of the suction head, and the suction head is disposed in the casing. A lateral bar of the suction head extends through a channel of the casing, with a rib on the bar being anchored in a first slot of the casing. The suction head is inserted into the hose and ten into the motor assembly.

In response to placing one end of an opening of the bag in the mouth and energizing the machine, the rib is pushed to move the suction head from the first slot to the second slot to extend a forward portion of the suction head into the opening of the bag. In an initial sealing operation, the cover is pressed toward the vacuum assembly to engage the pressing block with the electric heater for starting to weld the opening of the bag. The machine is moved from one end of the opening of the bag toward the other end thereof until a hole at the opening of the bag having substantially the same size as a section of the suction head is formed at a position near the other end. The roller rotates for moving the machine as straight as possible and for pressing the opening of the bag for providing flatness thereto. In a suction operation of the bag, the cover will disengage the pressing block from the electric heater. Pressing the switch will activate the motor assembly, with the initial sealing operation being disabled, and the suction head being enabled to suck air from the bag. Air is directed to the air outlet for discharge via the hose and the air inlet. Releasing the switch will deactivate the motor assembly when most of the air inside the bag has been exhausted. In a final sealing operation of the bag, the rib is pushed to move the suction head from the second slot to the first slot to retract the forward portion of the suction head into the casing. The machine is moved to cover the hole of the bag, and the cover is pressed toward the vacuum assembly to engage the pressing block with the electric heater for completely welding the opening of the bag.

The above and other objects, features and advantages of the present invention will become apparent from the following detailed description taken with the accompanying drawings.

DETAILED DESCRIPTION OF THE INVENTION

Figure 1:
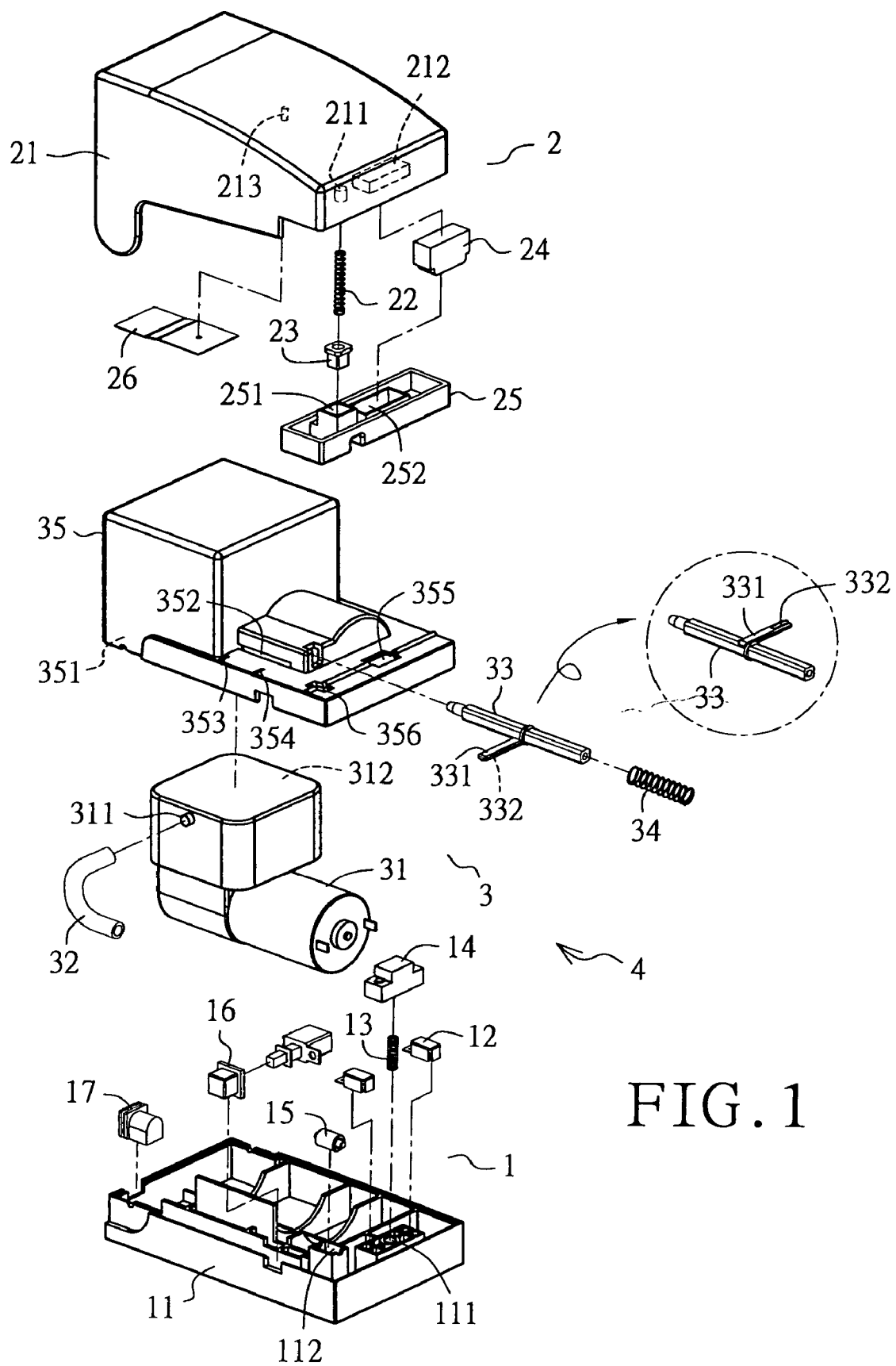
FIG. 1 is an exploded view of a preferred embodiment of a sealing machine according to the invention.
Figure 2:
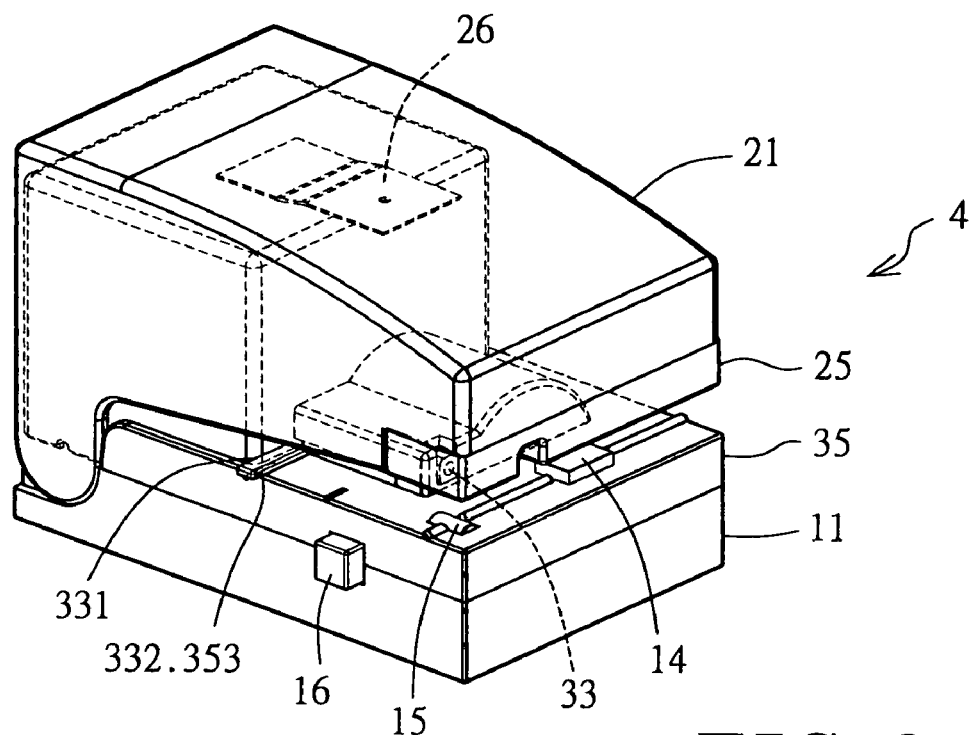
FIG. 2 is a perspective view of the assembled machine of FIG. 1.
Figure 5:
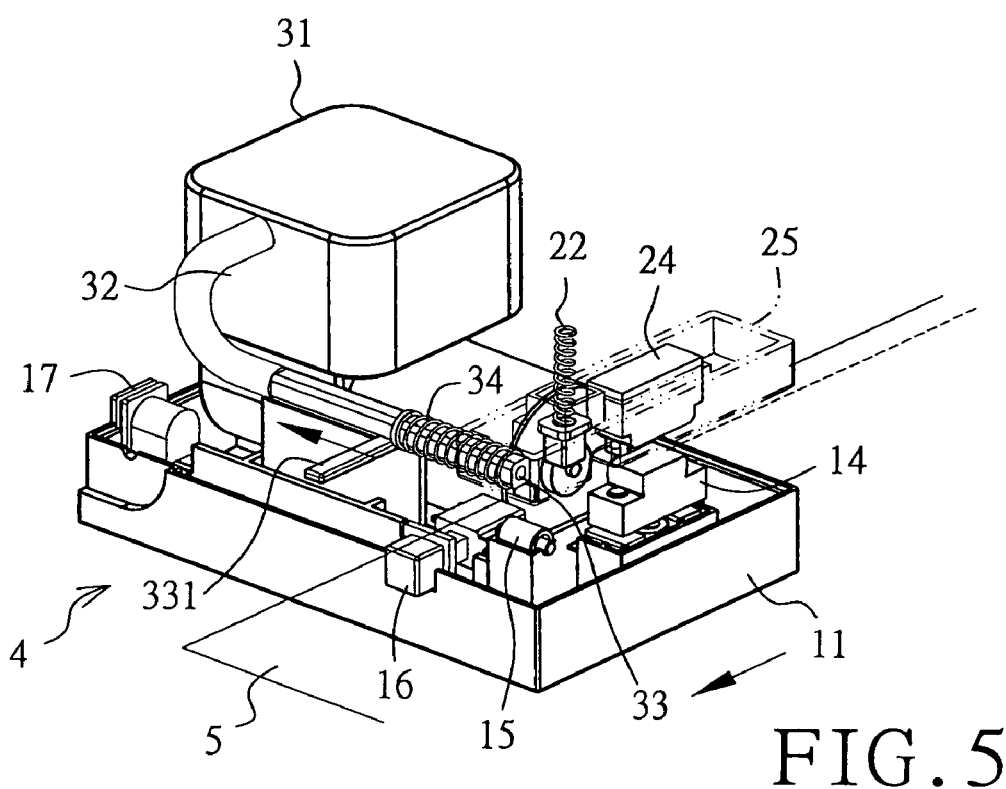
FIG. 5 is a view similar to FIG. 4 for showing a final sealing operation of the bag.
Figure 3:
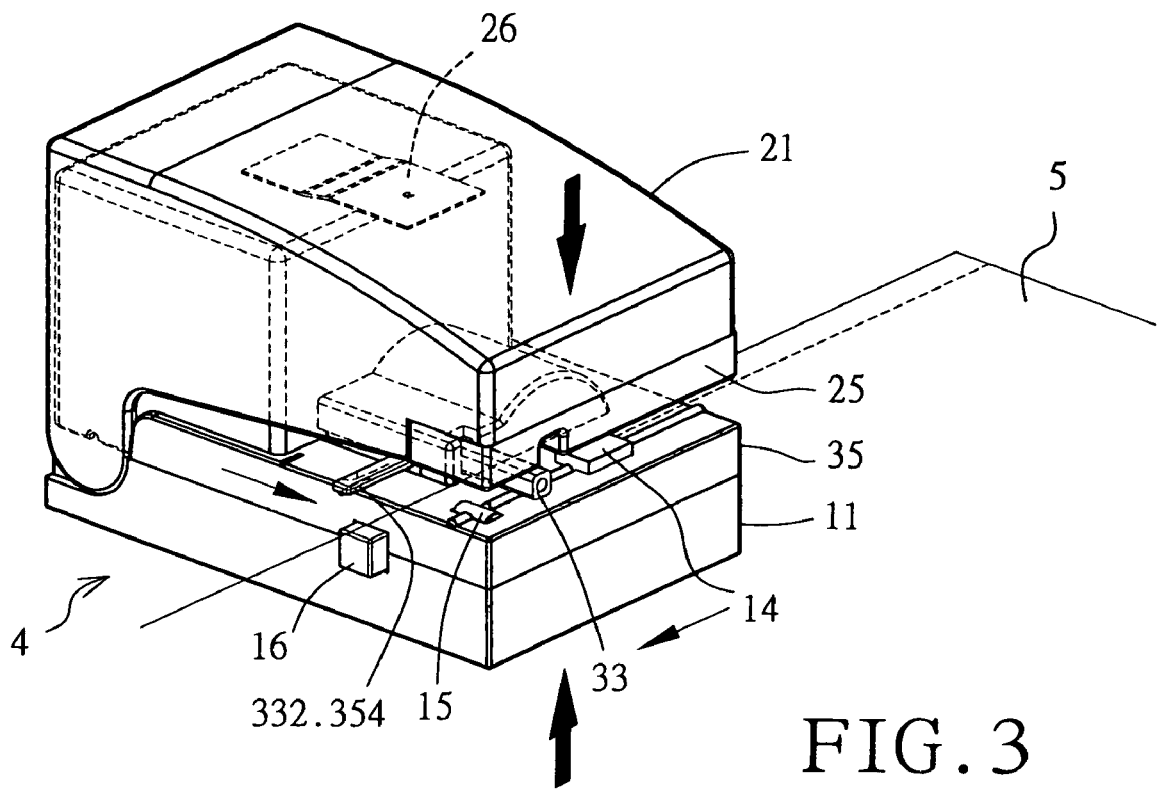
FIG. 3 is a view similar to FIG. 2, where the opening of a bag is placed across a mouth between the upper housing and the vacuum assembly on the lower housing in an initial sealing operation.
Figure 4:
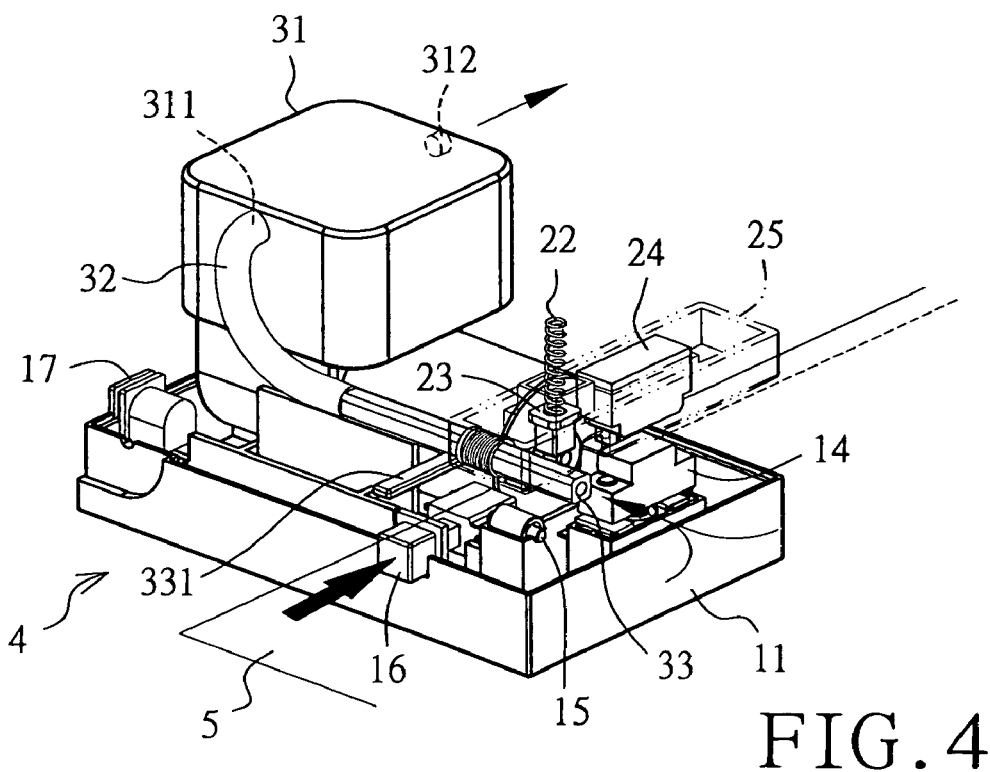
FIG. 4 is a perspective view of the machine of FIG. 3 with the upper housing removed for showing details of a vacuumizing operation of the bag.
Figure 6:
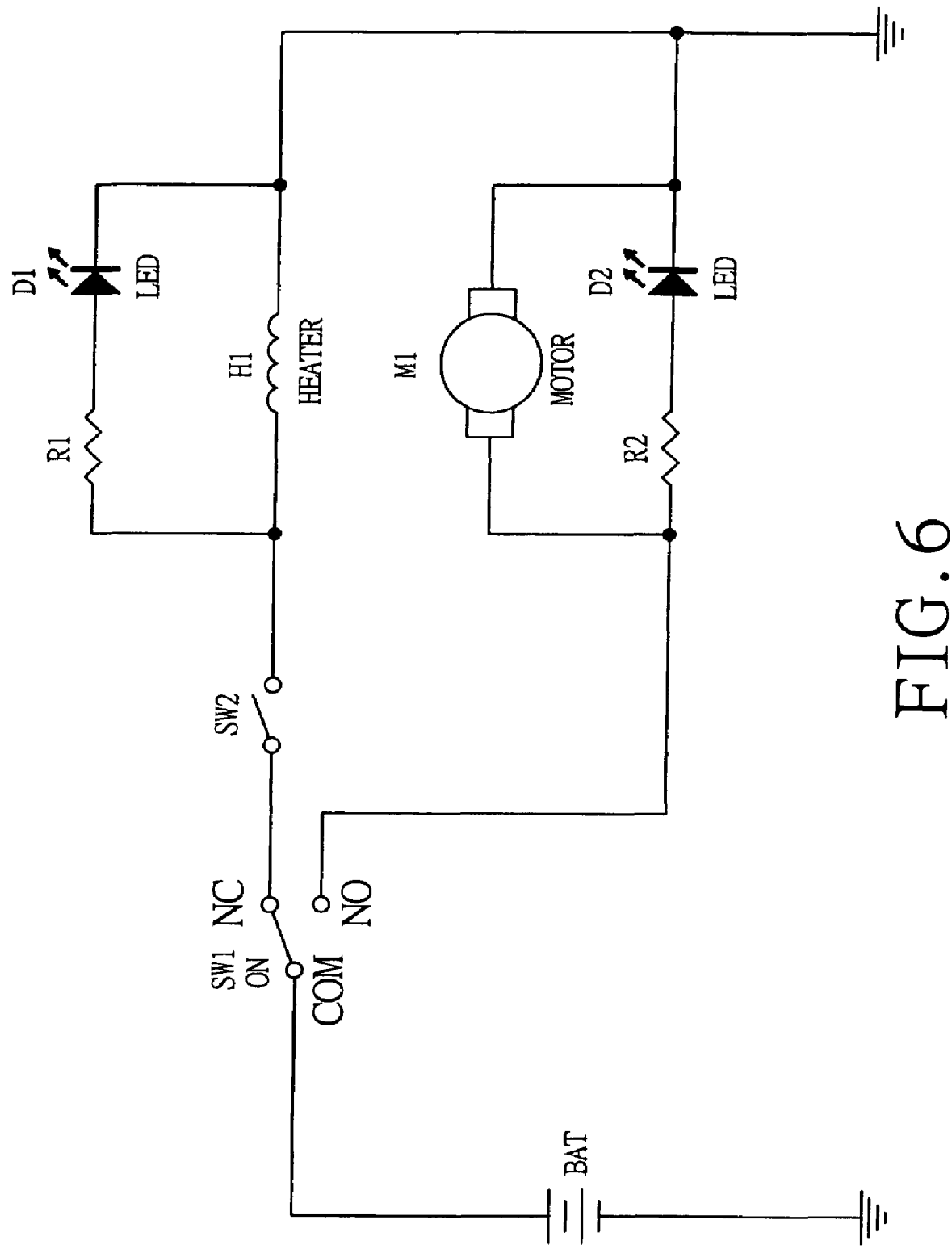
FIG. 6 is a circuit diagram of the preferred embodiment of the sealing machine according to the invention.

FIGS. 1, 2 and 5 show a pocket sealing machine 4 constructed in accordance with a preferred embodiment of the invention. The sealing machine 4 is adapted to heat seal a plastic bag or microwavable bag for sealing purposes and for sucking air from the same at the end of sealing so as to maintain airtightness of an article stored therein. The machine comprises a lower housing 1, an upper housing 2, and a vacuum assembly 3. Each component is discussed in detail below.

The lower housing 1 comprises a parallelepiped base 11 having a top opening and a plurality of compartments including a front compartment 111 and a front corner compartment 112. Two spaced resilient members 12 and an intermediate spring 13 are all disposed in the front compartment 111. An electric heater 14 is mounted on the resilient members 12 and the spring 13 (i.e., the electric heater 14 acts as a resilient element). A roller 15 is rotatably mounted on the front corner compartment 112. A switch 16 and a power socket 17 are, respectively, mounted on one side and the rear of the parallelepiped base 11.

The upper housing 2 includes a pivotal cover 21 including, on an underside of its top face, a front aperture 211, an adjacent parallelepiped recess 212, and a central projection 213. The upper housing 2 further includes a parallelepiped compartmented member 25 including a first compartment 251 and a second compartment 252. A pressing member 23 is provided in the first compartment 251. A spring 22 has one end anchored in the aperture 211 and the other end urged against the pressing member 23. A pressing block 24 is provided in the second compartment 252 and inserted in the parallelepiped recess 212. An elastic piece 26 having a forward hole is put on the projection 213.

The vacuum assembly 3 comprises a motor assembly 31, a hose 32, a suction head 33, a spring 34 and a casing 35. The motor assembly 31 includes a battery compartment (not shown), an air inlet 311 at one side, and an air outlet 312 at the opposite side. The casing 35 has its top face urged by a rear portion of the elastic piece 26 such that the cover 21 is able to pivot about the casing 35 in operation. The casing 35 further includes an internal space 351 for receiving the motor assembly 31. A horizontal channel 352 is provided at one side of the motor assembly cover 21. A first slot 353 is provided between the channel 352 and one side of the casing 35. A second slot 354 is provided forwardly of the first slot 353. A first cavity 355 is located adjacent the forward side of the casing 35, with a raised portion of the electric heater 14 extending therethrough. An adjacent second cavity 356 is included in casing 35 with an upper portion of the roller 15 exposed therethrough. The hose 32 has one end passing through the sidewall of the casing 35 to connect to the air inlet 311. The T-shaped suction head 33 is provided in a tunnel of the raised member, with the suction head 33 having a rear end connected to the other end of the hose 32 so as to be in fluid communication therewith. The suction head 33 further includes a lateral bar 331 extending through the channel 352. A rib 332 is formed along the bar 331, with the rib 332 anchored in the first slot 353 and slightly projected therefrom in an inoperative state. The spring 34 is put on the suction head 33 and biased between the T-shaped central joining portion of the suction head 33 and an inner wall of the raised member (i.e., the suction head 33 acts as a spring biased element). In an assembled state, the vacuum assembly 3 is mounted on the lower housing 1, and the upper housing 2 is pivotably mounted on the vacuum assembly 3 with a mouth formed therebetween.

Referring to FIGS. 3, 4, 5, and 6, operations of the machine 4 will be described in detail below. The machine 4 can be powered by either one or more batteries or an adapter connected to AC power depending on the environment. Once the machine 4 is energized, the machine 4 enters a ready state. Next, one end of the opening of a bag 5 with an article such as food or the like stored therein is placed in the mouth of the machine 4.

(1) In the ready state, a) the cover 21 is not pressed. Thus, the pressing block 24 does not contact the electric heater 14. b) Pushing the rib 332 of the bar 331 of the suction head 33 moves the suction head 33 from the first slot 353 to the second slot 354 so as to expose a forward portion of the suction head 33 out of the casing 35 (i.e., projecting into the opening of bag 5). Also, both the suction head 33 and the motor assembly 31 of the vacuum assembly 3 are not activated.

(2) In an initial heat sealing operation (see FIG. 3), both the suction head 33 and the motor assembly 31 remain the same as in the ready state. Next, pressing the cover 21 toward the vacuum assembly 3 causes the pressing block 24 to contact the electric heater 14 of the lower housing 1 for starting to heat seal the opening of the bag 5. At the same time, the machine 4 is moved relatively from one end of the opening of the bag 5 toward the other end thereof until a position near the other end is reached (i.e., leaving a hole at the opening of the bag 5 having substantially the same size as the section of the suction head 33). During relative movement of the bag 5, the roller 15 rotates on the bag 5 for making the movement as smooth as possible and pressing the bag 5 for providing flatness thereto.

(3) In a vacuumizing operation of the bag 5 (see FIG. 4), the cover 21 is released to disengage the pressing block 24 from the electric heater 14. The suction head 33 remains the same as in the ready state. Next, the switch 16 is pressed to activate the motor assembly 31, with the suction head 33 being enabled to suck air from the bag 5. The air is directed to the hose 32 and the air inlet 311 sequentially. Eventually, the air is exhausted from the motor assembly 31 through the air outlet 312. The user may release the switch 16 when most of the air in the bag 5 has been exhausted.

(4) In a final sealing operation of the bag 5 (see FIG. 5), the motor assembly 31 is deactivated once the switch 16 is released. Pushing the rib 332 moves the suction head 33 from the second slot 354 to the first slot 353 again so as to retract the forward portion of the suction head 33 into the casing 35 (i.e., out of the bag 5). Finally, the machine 4 is moved relative to the bag 5 to cover the small remaining open portion (i.e., the hole) of the bag 5 prior to pressing the cover 21 toward the vacuum assembly 3 to cause the pressing block 24 to contact the electric heater 14 for completely heat sealing the bag 5.

The sealing machine 4 according to the present invention has the following features:
a) Heat sealing is operated by simply pressing or releasing the cover 21;
b) Heat sealing is deactivated while the motor assembly 31 is activated to vacuum the bag 5;
c) The vacuum of the bag 5 is still maintained while the suction head 33 is retracted when a predetermined vacuum degree is reached;
d) Final sealing is operated after the suction head 33 is retracted out of the bag 5;
e) The suction head 33 is retractable by the spring 34; and
f) The sealing operation can be done anew if the sealing operation failed.

Furthermore, the pocket sealing machine 4 according to the invention has the following advantages:
a) The machine 4 has heat sealing and vacuum functions in combination.
b) The machine 4 is provided with a roller 15 for smoothing the bag 5 while sealing.
c) The machine 4 can be powered by either one or more batteries or an adapter connected to AC power. Once the machine 4 is energized, the machine 4 enters a ready state.
d) The machine 4 has an ergonomic smart switch.
e) The machine 4 is pocket-sized and easy to operate.
f) The machine 4 is suitable for all kinds of bags.

While the invention herein disclosed has been described by means of specific embodiments, numerous modifications and variations could be made thereto by those skilled in the art without departing from the scope and spirit of the invention set forth in the claims.

What is claimed is:

1. A pocket sealing machine for heat sealing a plastic bag or microwavable bag with an article stored therein so as to seal and make a vacuum comprising:
a lower housing;
two spaced resilient members and an intermediate spring disposed in a front compartment of the lower housing;
an electric heater mounted on the resilient members and the spring;
a switch and a power socket, respectively, mounted on one side and a rear of the lower housing;

an upper housing comprises a pivotal cover;
a compartmented member secured to a front bottom of the pivotal cover;
a pressing member and a pressing block located in the compartmented member;
a spring provided between the pivotal cover and the compartmented member and urged against the pressing member;
an elastic piece having a forward hole put on a projection projected downwardly from the pivotal cover; and
a vacuum assembly mounted on the lower housing and comprising a motor assembly, a hose, a suction head, a spring and a casing, with the spring being put on one end of the suction head and the suction head being disposed in the casing, with a lateral bar of the suction head extending through a channel of the casing, with a rib on the lateral bar being anchored in a first slot of the casing, with the suction head inserted into the hose and then into the motor assembly;
whereby in response to placing one end of an opening of the bag in the mouth and energizing the machine, the rib can be pushed to move the suction head from the first slot to a second slot to extend a forward portion of the suction head into the opening of the bag; whereby in an initial sealing operation, the cover is pressed toward the vacuum assembly to engage the pressing block with the electric heater for starting to weld the opening of the bag, and the machine can be moved from one end of the opening of the bag toward the other end thereof until a hole at the opening of the bag having substantially the same size as the forward portion of the suction head is formed at a position near the other end, wherein a roller rotates on the bag for pressing the opening of the bag for providing flatness thereto; whereby in a suction operation of the bag, the cover is released to disengage the pressing block from the electric heater, and pressing the switch will activate the motor assembly, with the initial sealing operation being disabled and the suction head being enabled to suck air from the bag and direct air to the air outlet for discharge via the hose and the air inlet, and releasing the switch will deactivate the motor assembly when most of the air inside the bag has been exhausted; and whereby in a final sealing operation of the bag, the rib is pushed to move the suction head from the second slot to the first slot to retract the forward portion of the suction head into the casing, the machine is moved to cover the hole of the opening of the bag, and the cover can be pressed toward the vacuum assembly to engage the pressing block with the electric heater for completely welding the opening of the bag.

2. The pocket sealing machine of claim 1, wherein a roller is rotatably mounted adjacent the electric heater.

3. The pocket sealing machine of claim 1, wherein the motor assembly is provided with an air inlet and outlet at both sides adjacent a top.

4. The pocket sealing machine of claim 1, wherein batteries are provided in the power socket.

5. The pocket sealing machine of claim 1, wherein an adapter connected to AC power are provided in the power socket.

* * * * *